Patented Feb. 24, 1942

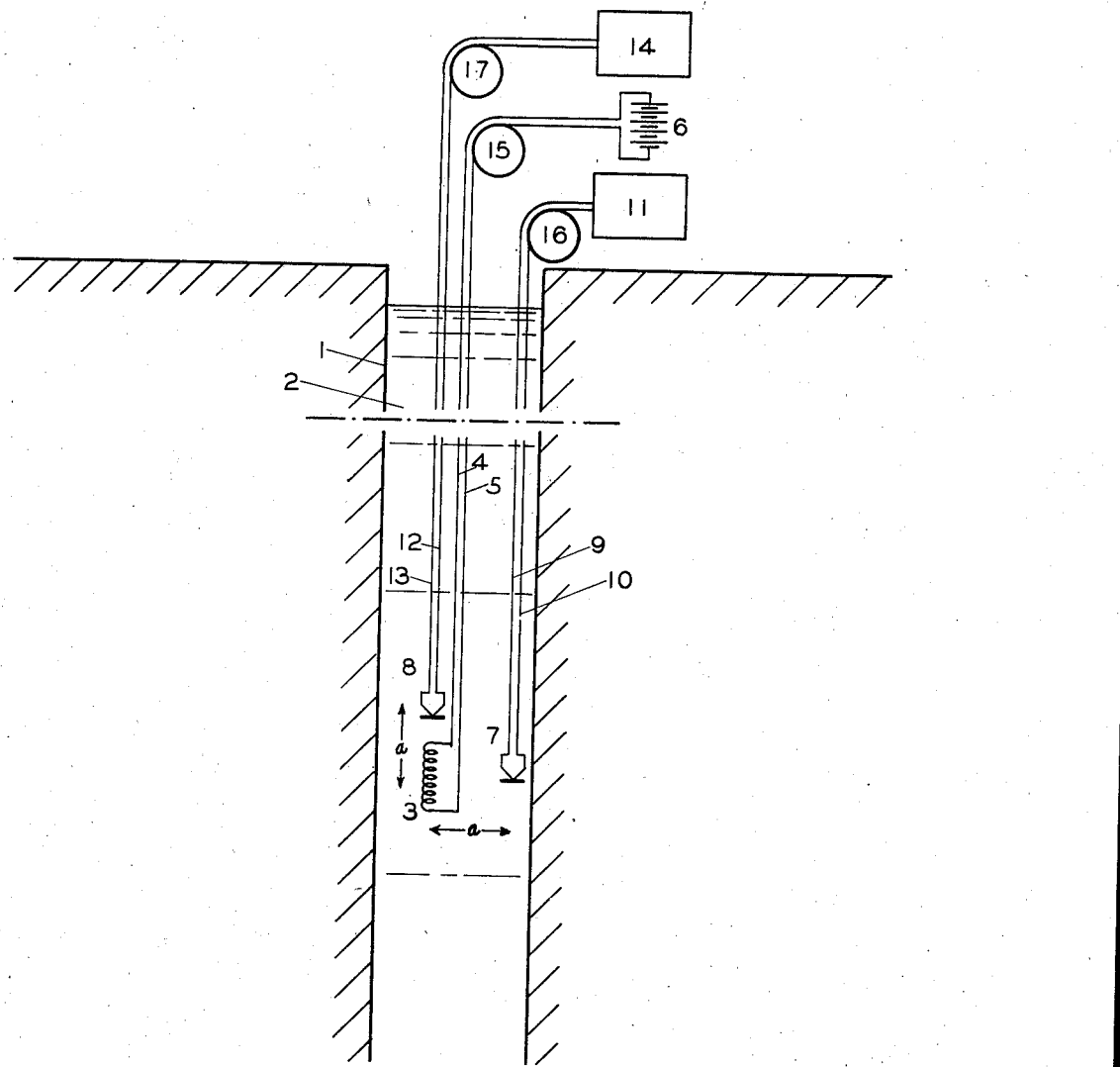

2,274,248

UNITED STATES PATENT OFFICE 2,274,248

WELL SURVEYING METHOD

Serge Alexander Scherbatskoy and Jacob Neufeld, Tulsa, Okla., assignors to Well Surveys, Incorporated, Tulsa, Okla., a corporation of Delaware Application May 7, 1937, Serial No. 141,364

5 Claims. (Cl. 73—51)

Our invention relates to a method for conducting investigations inside of bore or drill holes or other uniform openings in the earth, and has special application in connection with the mapping of formations penetrated by oil wells, water wells, and the like.

In carrying out these investigations, the different physical properties of the strata are utilized. Among those the most prominent are: electrical resistivity, porosity, specific inductive capacity, temperature and acoustic absorptivity. It has been found, however, that these physical characteristics do not always render it possible to distinguish various formations, and the measurements performed do not always give reliable results.

It is the object of the present invention to improve the results obtained in the prior art and to examine one additional physical property by means of which various formations traversed by a drill hole may be differentiated.

The invention is based essentially upon measurements of specific thermal absorptivity and is based upon the observation that the specific thermal absorptivity constitutes a measurable and characteristic quantity which renders it possible to distinguish various formations from each other and to locate the boundaries between the same.

The novel features which we believe to be characteristic of our invention are set forth with particularity in the appended claims. Our invention, itself, however, both as to its organization and method of operation, together with objects and advantages thereof, will be better understood by reference to the following description taken in connection with the accompanying drawing which illustrates diagrammatically and by way of example an apparatus according to the present invention for the investigation of drill holes. Referring to the drawing, an uncased drill hole 1 containing drilling fluid 2 is shown penetrating a formation to be explored. It may be assumed that the hole is in an oil field and intended to be a productive well, the fluid 2 consisting of the usual drilling fluid containing a suitable mud, which fluid was left in the hole following removal of the drill.

The exploring apparatus proper includes a heating element 3, the said heating element consisting of a high resistance wire connected through the insulated conductors 4, 5 to the voltage supply 6, and two electrical thermometers 7, 8 which may be of the thermocouple type well known in the art.

The output terminals of the thermocouple 7 are connected through insulated conductors 9, 10 to the voltage recorder 11, and the output terminals of the thermocouple 8 are connected through insulated conductors 12, 13 to the voltage recorder 14. The insulated conductors 4, 5 and 9, 10 and 12, 13 have individually a total length somewhat in excess of the depth of the hole to be explored, and are normally wound on drums 15, 16, 17 respectively, positioned adjacent to the top of the well.

The operation of this arrangement can be explained as follows: The generator 6 supplies current through conductors 4, 5 to the high resistance wire 3 and causes it to radiate heat in all directions. A certain amount of heat produced which is radiated from the wire 3 in the upward and in the downward direction is totally absorbed by the drilling fluid above and below the wire. On the other hand, the heat radiated from the wire 3 in the horizontal directions is only partly absorbed by the drilling fluid, and the remaining part of heat, transmitted through the drilling fluid, penetrates into the adjacent earth formation constituting the wall of the drill hole, and becomes finally absorbed by the said formation.

It is apparent that the greater is the thermal conductivity of the earth formation the more readily the heat will be absorbed from the heater 3 in a horizontal direction, and the larger will be the temperature drop in the medium surrounding the heater 3 in the horizontal direction. We have accordingly provided thermometers 7, 8 at the same distance a from the heater 3, but measured in a horizontal and in a vertical direction respectively, our object being to determine and to compare the temperature drops in the referred directions as a measure of the thermal absorptivity of the adjacent earth formations.

Assume that the absorptivity of the adjacent earth formation is the same as that of the drilling fluid. Then the temperature of 8 recorded at 14, and the temperature of 7 recorded at 11 will be substantially alike. If however, the exploring apparatus including the elements 3, 7, 8 is lowered to a different depth at which the thermal absorptivity of the adjacent stratum increases, then the flow of heat in the horizontal direction towards the wall becomes larger than the flow of heat in the vertical direction upwards. Consequently, the temperature of 7 recorded at 11 is lower than the temperature of 8 recorded at 18.

It is therefore apparent that for depths at which the temperature recorded at 11 decreases with respect to the temperature recorded at 14 the thermal absorptivity and the thermal conductivity of the adjacent earth formations increases, and for depth at which the temperature recorded at 11 increases with respect to the temperature recorded at 14 the thermal absorptivity and the thermal conductivity of the adjacent earth formations decreases.

It has been assumed here that the amount of heat absorptivity of a given medium increases with its conductivity. This is true, provided the medium is homogeneous and extended indefinitely in space. In the present case, the coefficient of absorptivity is relatively great and consequently the heat radiated from the wire 3 does not penetrate very far into the earth formations. Therefore, the lengths and widths involved are relatively small, and the approximation between the actual physical conditions encountered in the drill hole and the ideal conditions is satisfactory. It may be therefore assumed that the thermal absorptivity of the earth formation increases with the thermal conductivity.

It is now apparent that we have provided a novel method for investigating the conditions in a drill hole, the said method consisting in measuring the thermal conductivity and the thermal absorptivity of various formations traversed by the drill hole.

In view of our invention and disclosure variations and modifications to meet individual whim or particular need will doubtless become evident to others skilled in the art, to obtain part or all of the benefits of our invention without copying the structure shown, and we, therefore, claim all such in so far as they fall within the reasonable spirit and scope of our invention.

We claim:

1. Method of exploring characteristic differences between geologic strata traversed by a bore hole, consisting in moving a source of heat through the bore hole to successively expose each stratum individually to the heat, recording the temperature at a determined horizontal distance from the said source, recording the temperature at a determined vertical distance from the said source, and comparing both temperatures as a measure of the varying character of the traversed strata.

2. A method of determining geological structure of the earth in the vicinity of a drill hole, which comprises producing a source of heat at a point within the drill hole, transmitting the heat through the drill hole, and receiving at other points in the drill hole the heat effect of said source and measuring the intensity of such reception as an index of the character of the wall structure.

3. Method of exploring characteristic differences between geologic strata traversed by a drill hole, which comprises producing a source of heat within the drill hole, receiving the heat at two points within the drill hole, comparing the amounts of heat received at one of the said two points with respect to the other point, and repeating the said step for different depths of the source of heat while maintaining constant the relative position between the source of heat and the said two points.

4. Method of exploring characteristic differences between geologic strata traversed by a drill hole, which comprises producing a source of heat at a point within the drill hole, moving the source of heat to various depths in the drill hole, receiving at various points in the drill hole the heat effect of said source and measuring the intensity of such reception as an index of the character of the wall structure.

5. The method of determining the geologic nature and characteristics of a geologic formation traversed by a bore hole, which comprises: supplying heat to a localized zone within a bore hole and measuring a quantity influenced by the thermal diffusivity of the material surrounding the bore hole within said zone, whereby the geologic nature and characteristics of the geologic formation traversed by the bore hole may be determined from the data so obtained.

SERGE A. SCHERBATSKOY.
JACOB NEUFELD.